United States Patent [19]

Matsumura et al.

[11] Patent Number: 5,359,530
[45] Date of Patent: Oct. 25, 1994

[54] ANIMATED PLOTTING METHOD IN NC APPARATUS FOR MULTI-SYSTEM LATHE

[75] Inventors: Teruyuki Matsumura, Oshino; Satoru Shinozaki, Shimodate, both of Japan

[73] Assignee: Fanuc Ltd., Minamitsuru, Japan

[21] Appl. No.: 984,411

[22] PCT Filed: Jul. 10, 1992

[86] PCT No.: PCT/JP92/00890

§ 371 Date: Mar. 3, 1993

§ 102(e) Date: Mar. 3, 1993

[87] PCT Pub. No.: WO93/01536

PCT Pub. Date: Jan. 21, 1993

[30] Foreign Application Priority Data

Jul. 10, 1991 [JP] Japan ................... 3-195079

[51] Int. Cl.⁵ .................................. G06F 15/46
[52] U.S. Cl. ................ 364/474.26; 82/118; 364/474.11
[58] Field of Search .......... 364/474.22–474.27, 364/474.02, 474.11, 474.2, 188, 189, 191–193; 82/129, 118–120, 159; 345/1–6, 115–120

[56] References Cited

U.S. PATENT DOCUMENTS

| | | | |
|---|---|---|---|
| 4,646,247 | 2/1987 | Otsuki | 364/474.26 X |
| 4,725,960 | 2/1988 | Shima et al. | 364/474.26 |
| 4,994,977 | 2/1991 | Tsujido | 364/474.26 X |

FOREIGN PATENT DOCUMENTS

| | | |
|---|---|---|
| 61-32112 | 2/1986 | Japan . |
| 62-35913 | 2/1987 | Japan . |
| 1-96704 | 4/1989 | Japan . |
| 2-51705 | 2/1990 | Japan . |
| 2-199508 | 8/1990 | Japan . |
| 2-252004 | 10/1990 | Japan . |
| 2-311906 | 12/1990 | Japan . |
| 3-91812 | 4/1991 | Japan . |

Primary Examiner—Joseph Ruggiero
Attorney, Agent, or Firm—Staas & Halsey

[57] ABSTRACT

An animated plotting method in which an actual machining action is accurately simulated even if a tool rest is moved to another main spindle not directly associated therewith for cutting, or a single workpiece loaded on a main spindle is subjected to cutting operations by means of a plurality of tool rests. By virtue of a range specification command G10 for specifically setting a plottable range of each tool rest, a plottable range is imparted to each of the tool rests (S3, S4), and then the plottable range for each of the tool rests is displayed on either the left half (13a) or the right half (13b) of the display screen (13) depending on the operating position of each tool rest, or depending on whether each tool rest lies on the side of a first main spindle (14) or on the side of a second main spindle (16), thereby accurately simulating a path of the tool performing an actual machining operation and the state of cutting.

4 Claims, 5 Drawing Sheets

ANIMATED PLOTTING METHOD IN NC APPARATUS FOR MULTI-SYSTEM LATHE

TECHNICAL FIELD

The present invention relates to an improvement of an animated plotting method for use in a numerical control (NC) apparatus for a multi-system lathe.

BACKGROUND ART

An animated plotting method in which the states of cutting workpieces by means of a plurality of tool rests of a lathe are simulatively displayed on a single screen at the same time is a known technique. According to the conventional animated plotting method, a plurality of spaces obtained by splitting a monitoring screen depending on the number of the tool rests are assigned to the plottable ranges of the tool rests, or alternatively, the entire monitoring screen is fixedly assigned as the integral plottable range of all of the tool rests.

Figure 5:
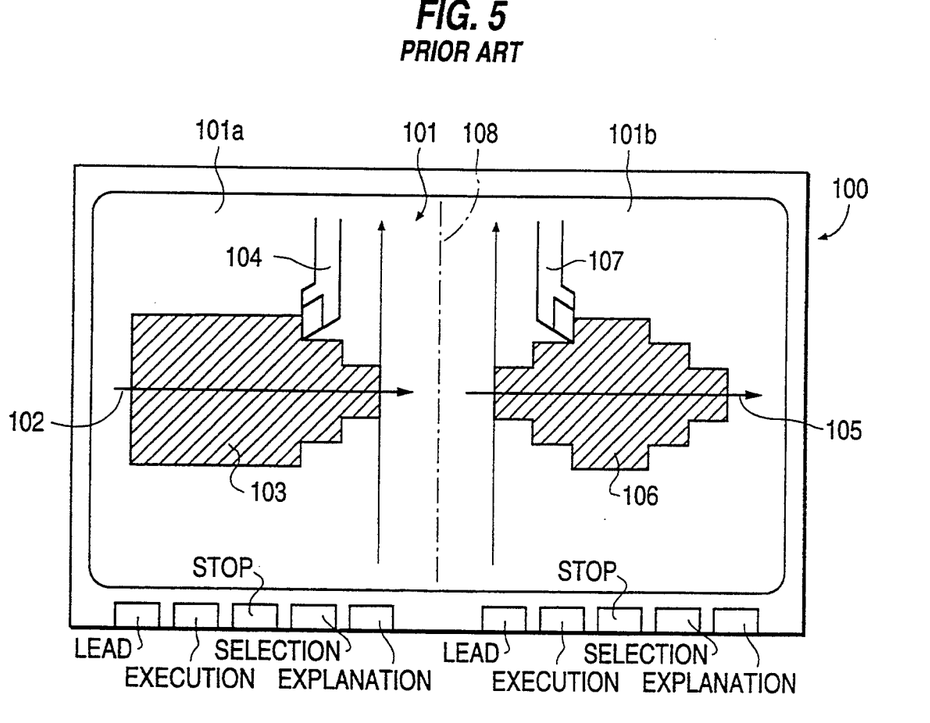
FIGS. 5 and 6 show an example of a simulative plotting according to the conventional method.

FIG. 5 illustrates, by way of example, a conventional animated plotting with the monitoring screen split into two display spaces correspondingly to a couple of tool rests. As seen from the figure, a display screen 101 of a display means 100 such as a CRT display unit includes a halved screen consisting of a first plottable range 101a for a tool 104 mounted on a first tool rest for exclusively machining a workpiece 103 loaded on a first main spindle 102, and a second plottable range 101b for a tool 107 mounted on a second tool rest for exclusively machining workpiece 106 mounted on a second main spindle 105, whereby the states of cutting the workpieces 103 and 106 each mounted on corresponding main spindles can be simulatively plotted on the same screen. In this case, the boundary 108 between the two plottable ranges cannot be shifted on the screen 101.

Moreover, the screen 101 is not necessarily allowed to correctly represent a mutual positional relationship between the first main spindle 102 and the second main spindle 105. Hence, if either the tool 104 or the tool 107 of the tool rests has moved beyond its plottable range, and such movement is plotted, the relative positions of the tool and the workpiece lying in the other plotting range may become inconsistent with each other to cause the problem of contradictory display.

Therefore, when a tool has moved to another range beyond its plotting range, normally, the plotting of such tool (in other range) will not be executed. In other words, the plotting of each tool rest will be clipped based on the corresponding plottable range.

Figure 7A:
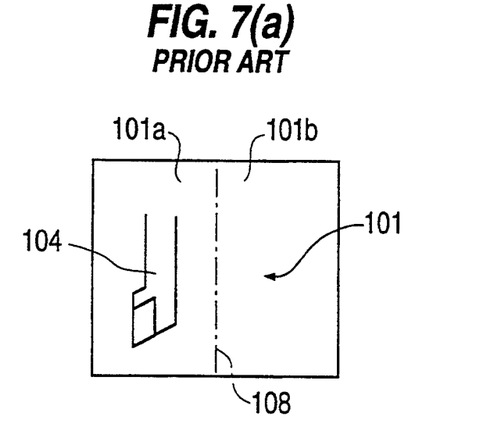
FIGS. 7A and 7B are a conceptual diagrams for explaining the function of clipping.
Figure 7B:
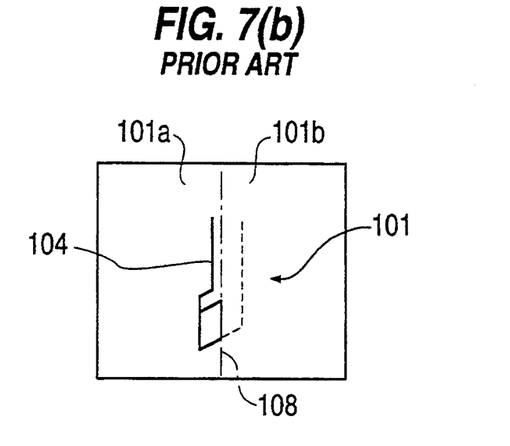

FIGS. 7(a) and 7(b) are conceptual diagrams illustrating a function of the clipping processing. If the tool 104, mounted on the first tool rest, lies within its plottable range 101a, then the whole image of the tool 104 can be plotted as shown in FIG. 7(a). If the part of the tool 104 lies beyond the boundary 108, however, such part of the tool 104 lying beyond the plottable range 101a will automatically be clipped as shown in FIG. 7B. Accordingly, even when the tool 104 of the first tool rest has moved into the machining area of the second tool rest, the configuration of the tool 104 and the cutting process will not be displayed. Similarly, even if the tool 107 mounted on the second tool rest has moved into the machining area of the first tool rest, the tool 107 and its cutting process will not be displayed.

Figure 6:
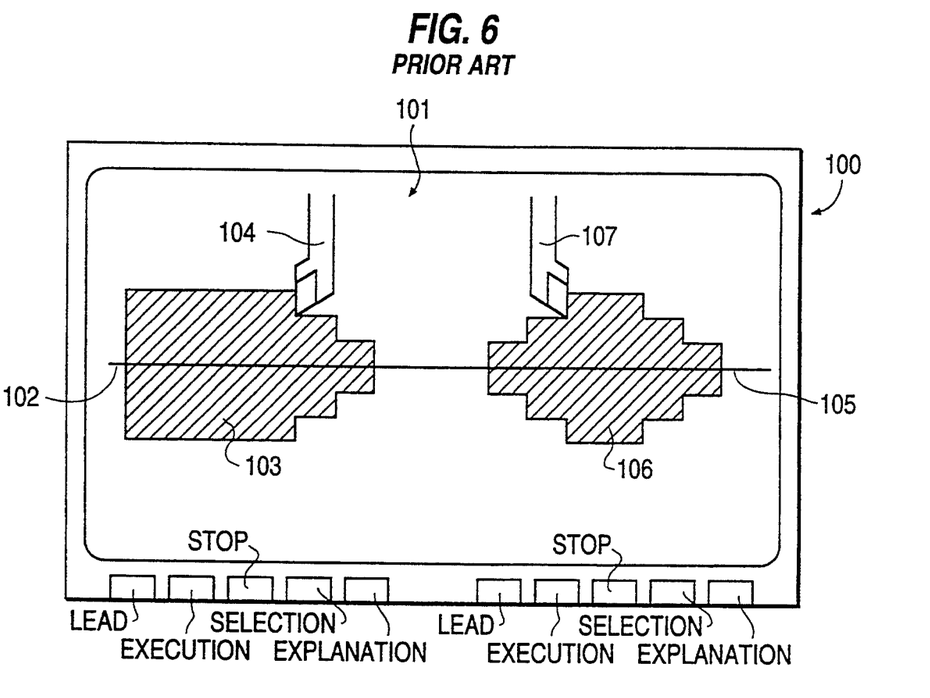

Also, in the case of the conventional example shown in FIG. 6, the workpiece 103 loaded on the first main spindle 102, the tool 104 mounted on the first tool rest for cutting the workpiece 103, the workpiece 106 loaded on the second main spindle 105 and the tool 107 mounted on the second tool rest for machining the workpiece 106 are integrally displayed in the same screen 101 while maintaining their relative positional relationships with one another. For example, according to this simulative plotting, the movement of the tool 104 mounted on the first tool rest from the current position of the workpiece 103 to the side of the workpiece 106 can be sequentially plotted. As apparent from this figure, however, the sizes of the images of the workpieces 103 and 106 and the tools 104 and 107 have to be reduced inevitably, and thus it is difficult to have a clear plotting of the machining state displayed on the screen.

Since the conventional NC apparatus for a multi-system lathe was exclusively intended to perform a cutting operation for each of the main spindles by providing a plurality of tool rests corresponding to the main spindles, or intended to cut a workpiece loaded on a single main spindle by means of a plurality of tool rests, the conventional animated plotting method described above and shown in FIG. 5 is good enough for the execution of a full simulation by the conventional animated plotting method.

Figure 8A:
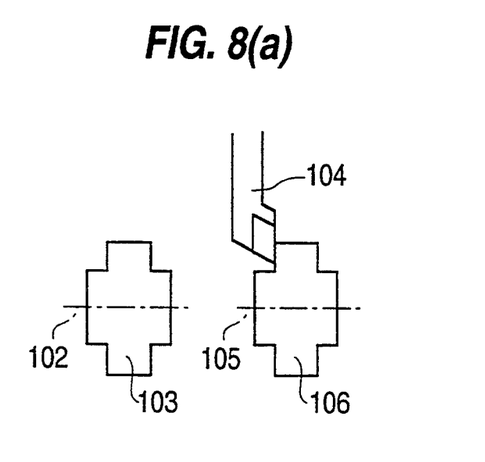
FIGS. 8A and 8 are a schematic diagrams illustrating a machining example where a tool rest displaced across a plurality of main spindles.
Figure 8B:
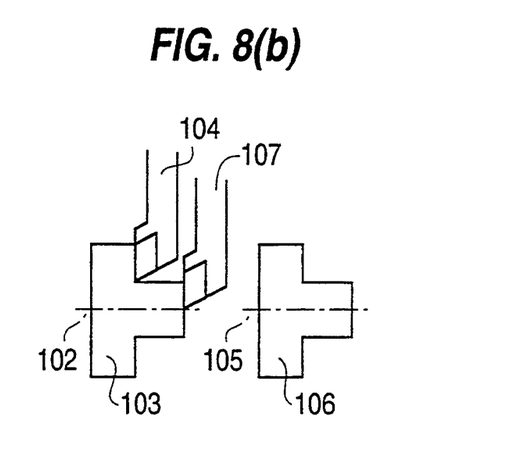

However, the recent NC apparatus for a multi-system lathe is often applied even to such a case where the tool 104 mounted on the first tool rest is moved to the machining area assigned to the second tool rest for cutting the workpiece 108 loaded on the second main spindle 105 as shown in FIG. 8(a), or such a case where the workpiece 103 loaded on the first main spindle 102 is subjected to the cutting operation by both the tool 107 of the second tool rest and the tool 104 of the first tool rest as shown in FIG. 8(b). In the cases of such application, therefore, it is difficult to simulatively plot such cutting operation by using the animated plotting method as such shown in FIG. 5. On the other hand, the display method shown in FIG. 6, which does not use the split screen, has a disadvantage in that it is not suited for displaying the cutting conditions, that is, the relationship between the tools and the workpieces as good as necessary as discussed previously.

DISCLOSURE OF THE INVENTION

It is therefore the object of the present invention to provide an animated plotted method for use in an NC apparatus for a multi-system lathe, in which an actual machining action is accurately simulated even if a tool rest is moved to another main spindle not directly associated therewith for cutting, or a single workpiece loaded on a main spindle is subjected to cutting operations by means of a plurality of tool rests.

In order to accomplish the above object, an animated plotting method of the present invention, for use in a numerical control (NC) apparatus for a multi-system lathe including at least two tool rests, in which at least one workpiece is controllably machined by the tool rests, and the state of the machining is simulatively plotted on a display screen, comprises the steps of imparting a code for specifying a plotting range on the display screen with respect to each of the tool rests in advance to a machining program at a predetermined position and defining a plotting range on the display screen of the tool rest in association with a block of the NC data read by the NC apparatus and correspondingly with the range specified by the code.

Preferably, the code includes a code representing a command for specifying a plotting range of the tool rest associated with the block, and a code representing a rectangle of the plotting range specified by two coordinate values.

Preferably, when a tool is displaced beyond the range corresponding to the plotting range on the display screen specified by the code, the display of the tool will be discontinued.

Preferably, the displacement of a tool on the display screen is displayed as a movement of a window having the tool displayed therein.

According to the present invention as described above, a range specification command for setting a plottable range of a tool rest is used to appropriately change the plottable range of each tool rest depending on the operating position thereof, thereby simultaneously simulating the state of machining of at least one workpiece on a single screen, so that the process of cutting the workpieces loaded on the main spindles and movement paths of the tool rests can be accurately simulated within a required range even when the tool rests move among a plurality of main spindles, and a plurality of main spindles simultaneously perform their cutting operations.

BEST MODE FOR CARRYING OUT THE INVENTION

Embodiments of the present invention will now be described with reference to the accompanying drawings.

Figure 1:
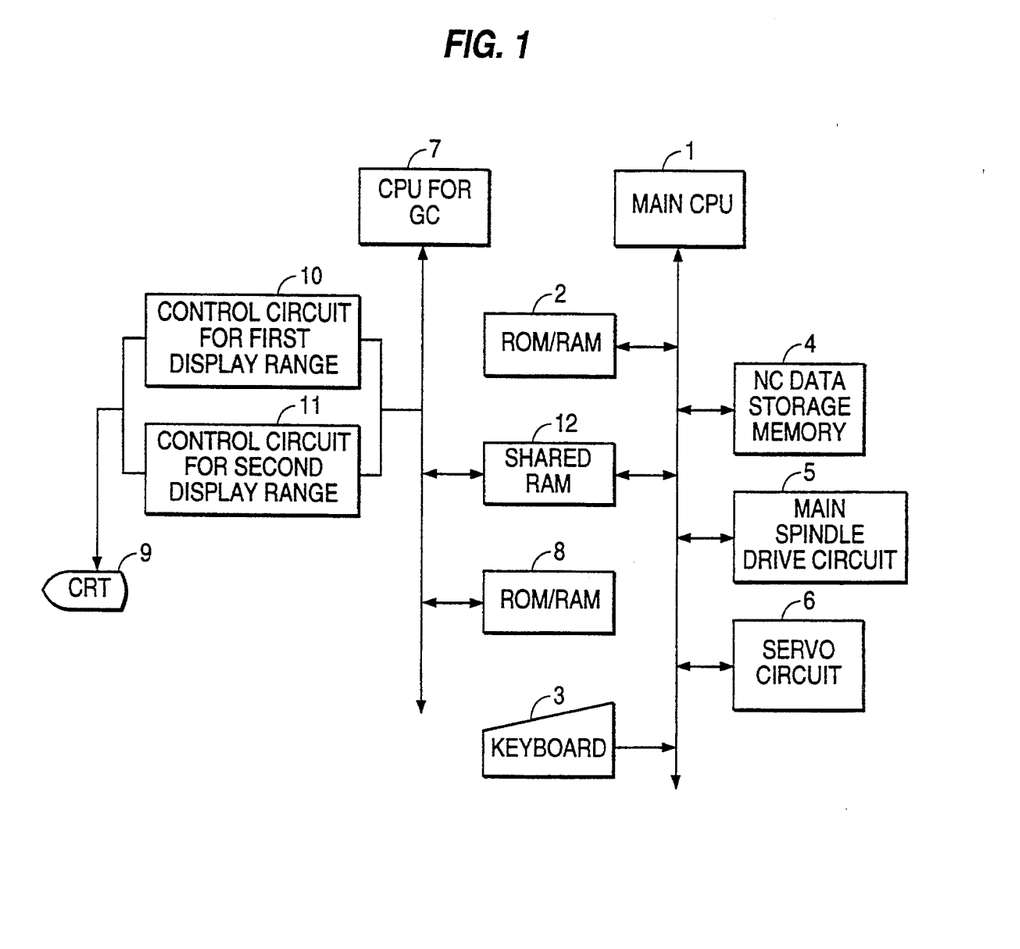
FIG. 1 is a block diagram schematically illustrating the principal part of an NC apparatus for a multi-system lathe which is an embodiment of a method in accordance with the present invention.

FIG. 1 is a block diagram illustrating a principal part of a numerical control (NC) apparatus for a multi-system lathe for executing a method embodying the present invention. The NC apparatus comprises a main CPU 1 which controls the drive of the multi-system lathe. The main CPU 1 is connected through a bus to a memory 2, which comprises a ROM storing a control program for the main CPU 1 and a RAM for temporary storage of data, a keyboard 3, an NC data storage memory 4, which stores a machining program previously created by an automatic programming apparatus, a main spindle drive circuit 5, and a servo circuit 6. In response to an instruction from the main CPU 1, the main spindle motors will be driven through the main spindle drive circuit 5 to rotate the workpieces, while the servo motors connected to the shafts of the tool rests receive pulses distributed through the servo circuit 6 to cause the tool rests to move in the directions of their respective main spindles and in their respective radial directions the edges of the tools to make cuts in the workpieces with the performing regular cutting operations of the workpieces, according to the control program stored in the memory 2 and the machining program stored in the NC storage memory 4. The following description will be made of a multi-system lathe including first and second main spindles and a couple of tool rests, by way of example. In FIG. 1, however, the main spindle motors associated with the spindles and the servo motors having two shafts for driving corresponding tool rests are not shown.

In compliance with an instruction derived from the machining program, the tools mounted on the tool rests are allowed to selectively cut into either one of the workpieces loaded on the first and second main spindles.

The NC apparatus for a multi-system lathe further comprises a CPU 7 for graphic control (hereinafter, referred to as CPU for GC). The CPU 7 for GC is connected through a bus to a memory 8 storing a control program for the CPU 7 for GC or the like, and to first and second display space control circuits 10 and 11, each comprising an LSI or the like to control corresponding display screens of a CRT display unit 9. There is also provided a shared 12 through which the bus of the main CPU 1 is connected to the bus of the CPU 7 for GC.

Thus, when a machining program is selected through the keyboard 3 at the time of check plotting or actual machining, the selected machining program will be read out from the NC data storage memory 4 and converted into (a series of) machining actions by means of the tools. Then, a tool movement for each block is downloaded into the shared RAM 12 in the form of a graphic command to initiate a simulation processing for plotting a tool path and a workpiece cutting process. Incidentally, the CRT display unit 9 includes right and left display spaces each having at its bottom a lead key for finding the leading edge of the machining program, an execution key for executing a simulation plotting, a stop key for terminating a plotting operation, a selection key for selecting another operation, an explanation key for requesting guidance for the explanation of an operation procedure, and other function keys.

Figure 2:
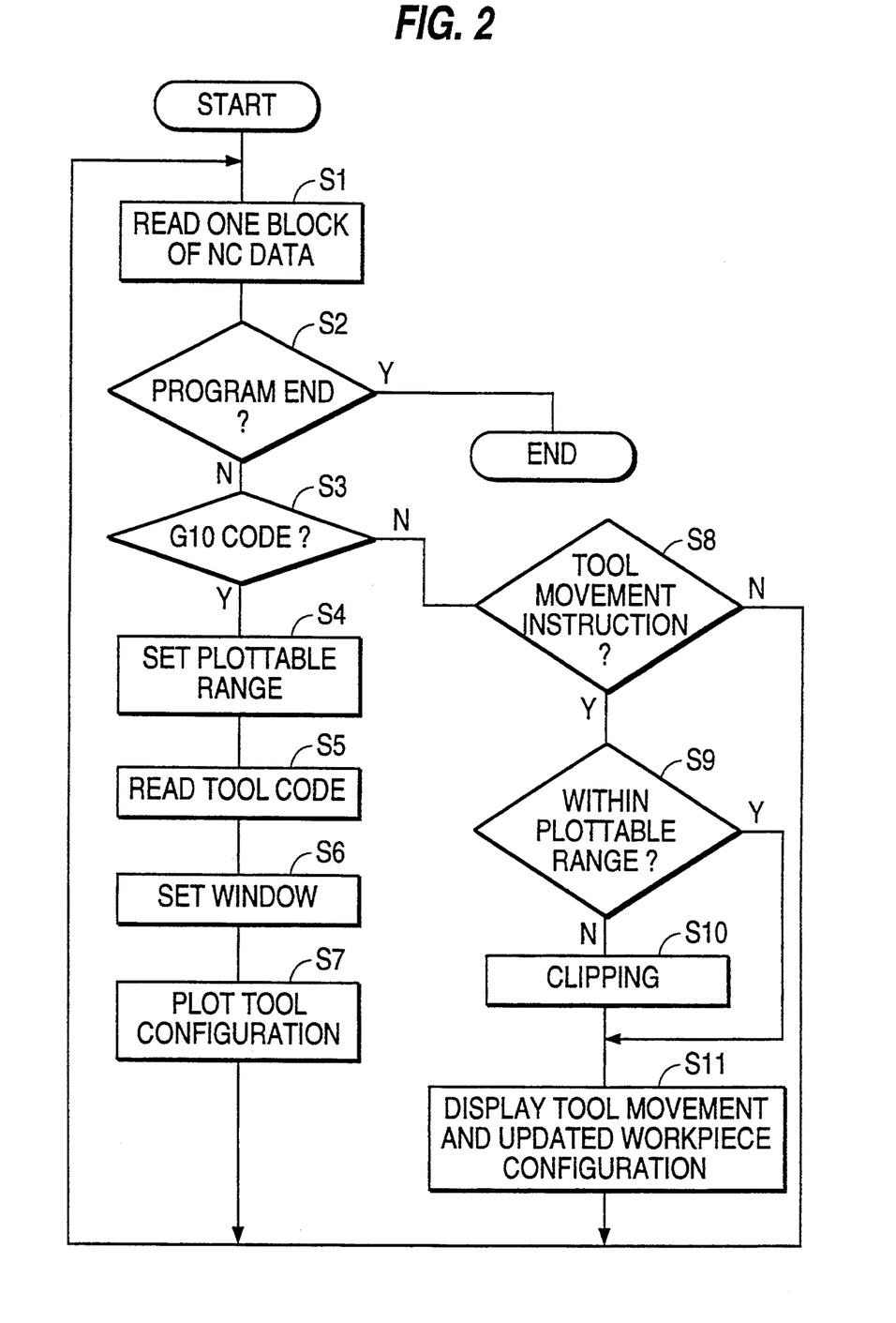
FIG. 2 is a flowchart diagramatically illustrating a simulative processing of the NC apparatus for the multi-system lathe of the same embodiment.

The processing action of this embodiment will next be described with reference to a simulation flowchart shown in FIG. 2.

Figure 3:
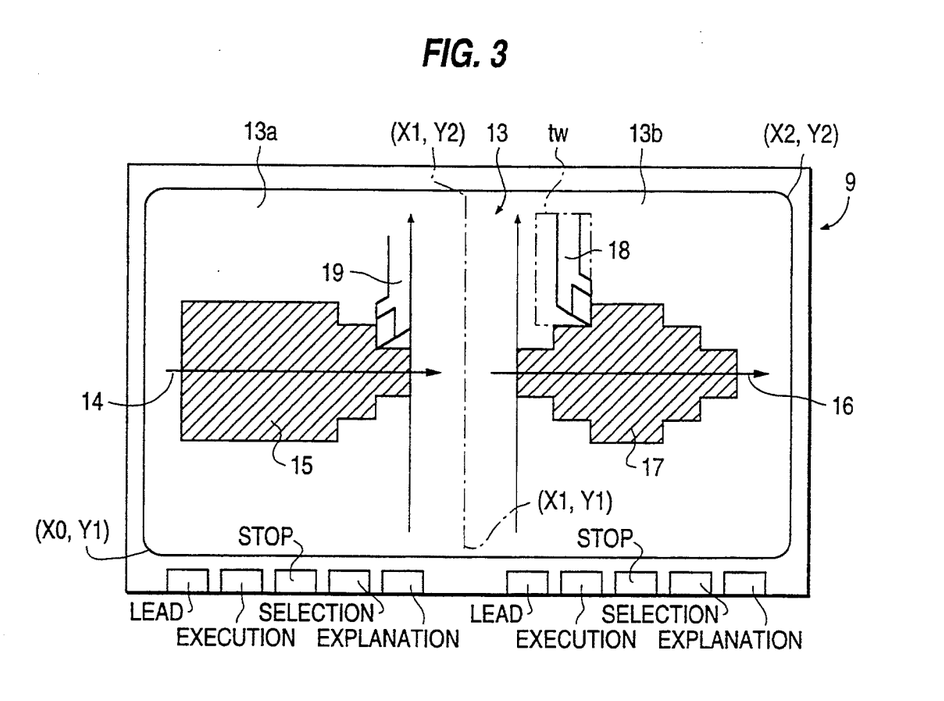
FIGS. 3 and 4 illustrate, by way of example, a display screen in the NC apparatus for the multi-system lathe of the same embodiment.

The CPU for GC at the start of a simulation first reads out initial configurations of a workpiece 15 mounted on a first main spindle 14 and a workpiece 17 mounted on a second main spindle 16 from the machining program downloaded into the shared 12 as shown in FIG. 3, and then correspondingly displays them on left and right halves of a display screen 13 on the CRT display unit 9, respectively, through the first and second display space control circuits 10 and 11. Subsequently, when the operation of the execution key on the CRT display unit 9 is detected, the CPU 7 for GC reads one block of NC data from the machining program downloaded into the shared RAM 12 (Step S1), and judges whether the NC data indicates a program end or not (Step S2); if not, then it judges whether the NC data is a G10 code for specifying a display space (Step S3).

The G10 code for specifying the display space is inputted in the form of "G10 Xi, Yi, Xj, Yj" into the machining program, and is used to set on the display screen 13 a rectangular plottable range having a diagonal line whose ends lie on points (Xi, Yi) and (Xj, Yj), respectively, on XY coordinates on the display screen 13. At least a first G10 code is positioned at the leading edge of the machining program for each of the spindles.

Thus, the CPU 7 for GC which has detected the G10 code judges whether the NC data having this code is associated with the first tool rest or the second tool. When the code is for the first tool rest, a plottable range for the first tool rest is set on the display screen 13 based on the data (Xi, Yi) and (Xj, Yj) with respect to the detected code, while, when the detected code is for the second tool rest, a plottable range for the second tool rest is to be set on the display screen 13 on the basis of the data (Xi, Yi) and (Xj, Yj) (Step S4).

Then, the CPU 7 for GC reads a tool code of the tool rest with the G10 code assigned thereto from the shared RAM 12 (Step S5)), produces a tool display window comprising a horizontal line and a vertical line each passing through the point of the tool (Step S6), and brings the point of the tool to a machining start position based on data of machining start position of the present tool and tool configuration data both derived from the shared RAM 12, thereby displaying a tool configuration (Step S7). FIG. 3 illustrates, by way of example, a case where two points, (X1, Y1) and (X2, Y2), of the first G10 code, associated with the first tool rest, correspond to the middle lower end and the right upper end, respectively, on the display screen 13, and the tool 18 mounted on the first tool rest is used to cut the workpiece 17 loaded on the second main spindle 16. In this instance, the plottable range of the first tool rest will appear on the right half 13b of the display screen 13.

The CPU 7 for GC thus allowing the tool configuration to be displayed on the display screen 13 successively reads NC data by the block from the shared RAM 12 until the program end is read (Step S1). When this NC data is neither one signifying the program end nor the G10 code for specifying a display space (Steps S2 and S3), then it will be judged whether or not the NC data includes an instruction for movement to the tool rest having a plottable range specified in advance by the G10 code (Step S8). If the NC data includes the instruction for movement to the tool rest whose plottable range is in advance specified, then it is judged whether or not the tool mounted on the tool rest to be moved by the movement instruction lies within the previously set plottable range (Step S9). If it lies within the plottable range, the entire configuration of the present tool will be displayed with its actual movement, and a part of the displayed workpiece, set with respect to this tool and superimposed on the tool display window, that is a display of the cut portion, will be erased (Step S11). If the tool configuration partly lies outside the plottable range, the part of the tool extending beyond the plottable range will be clipped for not being displayed (Step S10), and the configuration of the tool lying within the plottable range and the conditions of cutting of the workpiece will be displayed on the display screen 13 (Step S11).

The same applies in the case where a G10 code set in the NC data associated with the other tool rest is detected in the processing of Step S3. More specifically, a plottable range of the tool rest is set on the display screen 13 based on the G10 code of the tool rest (Step S4), a code of the tool mounted on the tool rest is read (Step S5), a tool display window tw comprising a horizontal line and a vertical line each passing through the point of the tool will be produced based on the read code (Step S6), and based on data of a machining start position of the tool and data of the tool configuration, the point of the tool is brought to the machining start position where the tool configuration is displayed (Step S7), and, in compliance with the relationship between the position to which the tool has been moved and its plottable range, the display of the tool movement, simulated display of cutting condition of the workpiece and the clipping processing will take place.

FIG. 3 illustrates a case where the two points (X0, Y1) and (X1, Y2) represented by the G10 code "G10 X0, Y1, X1, Y2", which has been set at the leading edge of the cutting movement program of the second tool rest, respectively correspond to the lower left end and the upper middle end of the display screen 13, and the tool 19 mounted on the second tool rest cuts the workpiece 15 loaded on the first main spindle 14. In this case, the plottable range of the second tool rest is set on the left half 13a of the display screen 13.

Thus, at this stage in the example shown in FIG. 3, the plottable range of the tool 18 mounted on the first tool rest is set on the right half 13b of the display screen 13, while the plottable range of the tool 19 mounted on the second tool rest is set on the left half 13a of the display screen 13. Accordingly, in case the tool 18 of the first tool rest is required to return to the side of the workpiece 15 loaded on the first spindle 14 for cutting, the entirety of the tool 18 which has moved to the side of the workpiece 15 will have to be clipped. Therefore, under these conditions, the cutting state of the tool 18 is not allowed to appear on the left half 13a of the display screen 13.

Figure 4:
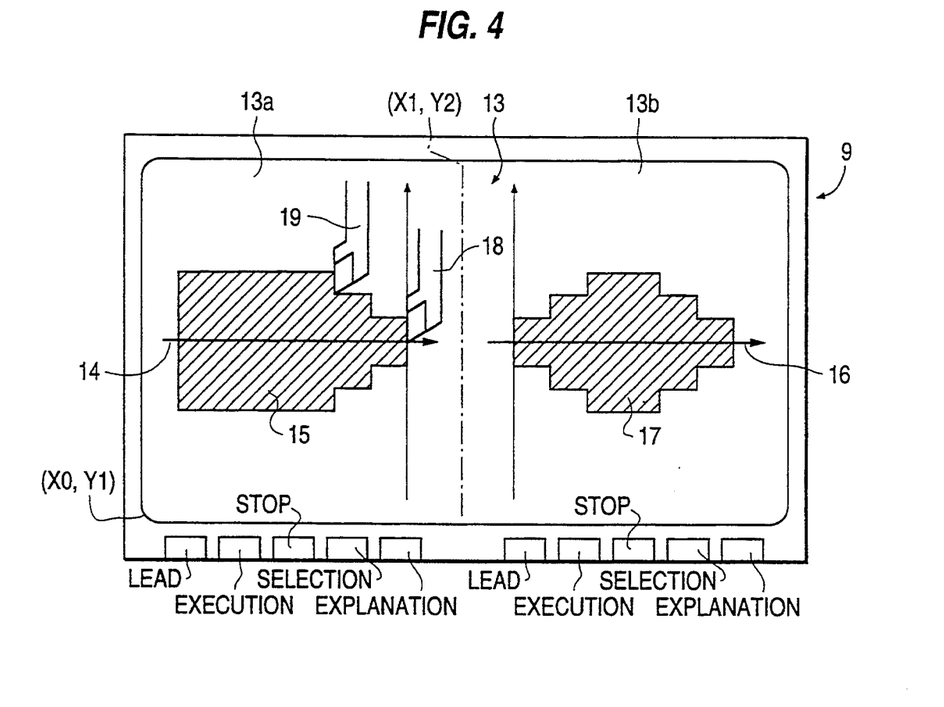

However, a G10 code for specifying a display space can be inserted into a program at any position, so that, when the G10 code "G10 X0, Y1, X1, Y2" is inserted immediately before the NC data for moving the tool 18 mounted on the first tool rest towards the side of the workpiece 15, and the plottable range of the first tool rest is reset for being displayed in the left half 13 of the display screen 13, the cutting operation and displacement of the tool 18 mounted on the first tool rest and the tool 19 mounted on the second tool rest for cutting the workpiece 15, as well as the cutting process of the workpiece 15, can simulatively be displayed in the left half 13a of the display screen 13 at the same time, as shown in FIG. 4.

The same applies to a case where the tool 19 mounted on the second tool rest is moved, for cutting operation, towards the side of the workpiece 17 loaded on the second main spindle 16. More specifically, when a G10 code "G10 X1, Y1, X2, Y2" is previously inserted to reset the plottable range of the second tool rest for being displayed in the right half 13b of the display screen 13, the tool 18 of the first tool rest and the tool 19 of the second tool rest each moving for cutting the workpiece 17 and the cutting condition of the workpiece 17 can simulatively be displayed in the right half 13b of the display screen 13 at the same time.

Since a rectangular plottable range has a diagonal line with its both ends respectively represented by (Xi, Yi) and (Xj, Yj), which are designated by a code "G10 Xi, Yi, Xj, Yj", the first and second tool rests may have their respective plottable ranges, which are arbitrarily assigned on the display screen 13 depending on the respective action ranges of the tool rests.

Furthermore, when only one of the main spindles is used to perform a cutting or other machining operation, only the initial configuration of the workpiece loaded on the first main spindle 14 or the second main spindle 16 is first read for the display on the display screen 13. Then, a G10 code "G10 X0, Y1, X2, Y2" is set for both the first and second tool rests to designate the whole of the display screen 13 as their respective plottable ranges. Thus, in the same manner as the example of a conventional method shown in FIG. 6, it is possible for the method according to the present invention to execute a simulative plotting even in the case where a single workpiece is subjected to cutting operations by a plurality of tools each mounted on the tool rest.

The foregoing description is concerned with a multi-system lathe having first and second main spindles and a couple of tool rests as an embodiment of the present invention. However, except for the difference in the processing of assigning the plottable ranges on the display screen 13, the same processing can be applied even to the case of another multi-system lathe having more than two main spindles.

What is claimed is:

1. An animated plotting method for use in a numerical control (NC) apparatus for a multi-system lathe including at least two tool rests, in which at least one workpiece is controllably machined by the tool rests, and the state of the machining is simulatively plotted on a display screen, comprising the steps of;

imparting a code for specifying a plotting range on the display screen with respect to each of the tool rests in advance to a machining program at a predetermined position; and defining the plotting range on the display screen for each tool rest, in association with a block of NC data read by the NC apparatus and correspondingly with the range specified by the code.

2. The animated plotting method according to claim 1, wherein:

the code includes a first code representing a command for specifying the plotting range of the tool rest associated with the block, and a second code representing a rectangular plotting range specified by two coordinate values.

3. The animated plotting method according to claim 1, wherein, when a tool, associated with one of the tool rests, is displaced beyond the range corresponding to the plotting range specified by the code on the display screen, the display of the tool will be discontinued.

4. The animated plotting method according to claim 1, wherein the displacement of a tool, associated with one of the tool rests, on the display screen is displayed as a movement of a window in which the tool is displayed.

* * * * *

UNITED STATES PATENT AND TRADEMARK OFFICE
CERTIFICATE OF CORRECTION

PATENT NO. : 5,359,530
DATED : October 25, 1994
INVENTOR(S) : Teruyuki MATSUMURA et al.

It is certified that error appears in the above-indentified patent and that said Letters Patent is hereby corrected as shown below:

Column 2, line 30, delete "108" and insert --106--.

Column 3, line 42, delete "8" (second occurrence) and insert --8b-- therein.

Column 4, line 3, after "workpieces" insert --,-- and delete "with the" and insert --thereby--; and line 54, after "shared" insert --RAM--.

Signed and Sealed this

Seventeenth Day of January, 1995

Attest:

BRUCE LEHMAN

Attesting Officer          Commissioner of Patents and Trademarks